US010643582B2

(12) United States Patent
Ichiki

(10) Patent No.: US 10,643,582 B2
(45) Date of Patent: May 5, 2020

(54) PIVOT MECHANISM AND KEYBOARD APPARATUS

(71) Applicant: YAMAHA CORPORATION, Hamamatsu-shi (JP)

(72) Inventor: Shunsuke Ichiki, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/130,137

(22) Filed: Sep. 13, 2018

(65) Prior Publication Data

US 2019/0043459 A1 Feb. 7, 2019

Related U.S. Application Data

(63) Continuation of application No. PCT/JP2017/006255, filed on Feb. 21, 2017.

(30) Foreign Application Priority Data

Mar. 25, 2016 (JP) ................................ 2016-061683

(51) Int. Cl.
*G01C 3/12* (2006.01)
*G10C 3/12* (2006.01)
(Continued)

(52) U.S. Cl.
CPC ................ *G10C 3/12* (2013.01); *G10B 3/12* (2013.01); *G10H 1/34* (2013.01); *G10H 1/344* (2013.01)

(58) Field of Classification Search
CPC ........................................................ G10C 3/12
See application file for complete search history.

(56) References Cited

U.S. PATENT DOCUMENTS 2,530,832 A * 11/1950 Martin .................... G10C 3/12 84/434
3,559,910 A * 2/1971 Babb ...................... F16L 3/133 248/59

(Continued)

FOREIGN PATENT DOCUMENTS

JP S57168304 U 10/1982
JP H0936563 A 2/1997

(Continued)

OTHER PUBLICATIONS

International Search Report issued in Intl. Appln. No. PCT/JP2017/006255 dated May 9, 2017. English translation provided.

(Continued)

*Primary Examiner* — Robert W Horn
(74) *Attorney, Agent, or Firm* — Rossi, Kimms & McDowell LLP

(57) ABSTRACT

A pivot mechanism includes: a shaft; a bearing including an opening portion in which the shaft is to be inserted, wherein a size of the opening portion at an open end of the bearing which has flexibility is less than a diameter of the shaft, and the bearing is configured to pivot about a pivot axis relative to the shaft; and a stopper disposed spaced apart from the shaft in a direction in which the shaft inserted in the opening portion moves away from the bearing, the stopper being movable in a direction different from the direction in which the shaft moves away from the bearing.

7 Claims, 9 Drawing Sheets

(51) Int. Cl.
*G10B 3/12* (2006.01)
*G10H 1/34* (2006.01)

(56) References Cited

U.S. PATENT DOCUMENTS

| | | | | | |
|---|---|---|---|---|---|
| 4,044,646 | A * | 8/1977 | Invernati | G10C 3/12 | 84/435 |
| 4,840,334 | A * | 6/1989 | Kikuchi | F16L 3/13 | 24/453 |
| 4,842,237 | A * | 6/1989 | Wollar | H02G 3/26 | 248/548 |
| 5,385,320 | A * | 1/1995 | Ismert | F16L 3/10 | 248/62 |
| 5,610,352 | A * | 3/1997 | Yamaguchi | G10C 3/12 | 84/251 |
| 6,322,274 | B1 * | 11/2001 | Binotti | F16C 11/04 | 403/13 |
| 6,554,232 | B1 * | 4/2003 | Macris | F16B 5/0685 | 248/65 |
| 6,653,542 | B2 * | 11/2003 | Suzuki | G10C 3/12 | 84/423 R |
| 6,779,763 | B2 * | 8/2004 | Miura | F16L 3/13 | 248/68.1 |
| 6,837,017 | B2 * | 1/2005 | Hardy, Jr. | E01C 11/18 | 404/136 |
| 7,328,538 | B2 * | 2/2008 | Trangsrud | E04C 5/20 | 52/682 |
| D564,866 | S * | 3/2008 | Ellery | D8/373 | |
| 7,514,613 | B2 * | 4/2009 | Yamaguchi | G10C 3/12 | 84/236 |
| 7,896,296 | B2 * | 3/2011 | Julian | F16L 3/127 | 248/547 |
| 8,003,871 | B2 * | 8/2011 | Kitajima | G10C 3/12 | 84/423 R |
| 8,076,563 | B2 * | 12/2011 | Kamimura | G10C 3/12 | 84/423 R |
| 8,110,732 | B2 * | 2/2012 | Shimoda | G10C 3/12 | 84/423 R |
| D679,177 | S * | 4/2013 | Craig | D8/395 | |
| 8,766,075 | B2 * | 7/2014 | Ishida | G10H 1/34 | 84/423 R |
| 8,844,882 | B2 * | 9/2014 | Cook | H02G 1/00 | 174/156 |
| 8,882,059 | B2 * | 11/2014 | Schmidt | F16L 3/1041 | 248/74.3 |
| 9,082,372 | B2 * | 7/2015 | Suzuki | G10C 3/12 | |
| 9,383,041 | B2 * | 7/2016 | Kanie | F16L 3/13 | |
| 10,115,382 | B2 * | 10/2018 | Nishimura | G10C 3/12 | |
| 10,373,596 | B2 * | 8/2019 | Suzuki | G10H 1/346 | |
| 2018/0268787 | A1 * | 9/2018 | Taniguchi | G10C 3/18 | |
| 2019/0043459 | A1 * | 2/2019 | Ichiki | G10C 3/12 | |
| 2019/0043463 | A1 * | 2/2019 | Ichiki | G10B 3/12 | |
| 2019/0378486 | A1 * | 12/2019 | Kamiya | G10H 1/346 | |

FOREIGN PATENT DOCUMENTS

| | | |
|---|---|---|
| JP | 2001265347 A | 9/2001 |
| JP | 2002207484 A | 7/2002 |
| JP | 2005119536 A | 5/2005 |

OTHER PUBLICATIONS

Written Opinion issued in Intl. Appln. No. PCT/JP2017/006255 dated May 9, 2017. English translation provided.

International Preliminary Report on Patentability issued in Intl. Appln. No. PCT/JP2017/006255 dated Oct. 4, 2018. English translation provided.

* cited by examiner

PIVOT MECHANISM AND KEYBOARD APPARATUS

CROSS REFERENCE TO RELATED APPLICATION

The present application is a continuation application of International Application No. PCT/JP2017/006255, filed on Feb. 21, 2017, which claims priority to Japanese Patent Application No. 2016-061683, filed on Mar. 25, 2016. The contents of these applications are incorporated herein by in their entirety.

BACKGROUND

The present disclosure relates to a pivot mechanism. The present disclosure also relates to a keyboard apparatus including the pivot mechanism.

A conventional acoustic piano such as a ground piano and an upright piano is constituted by lots of components. Since assembly of these components is very complicated, a long time is required for the assembly. In particular, an action mechanism provided corresponding to each key requires lots of components, and assembly of these components is very complicated.

The action mechanism includes a hammer provided with a weight under the key to give a feeling (hereinafter referred to as “touch feeling”) to a finger of a player through the key. The hammer pivots so as to raise the weight of the hammer in response to pressing of the key. For example, a hammer disclosed in Patent Document 1 (Japanese Patent Application Publication No. 2002-207484) is mounted on a frame such that a bearing having a round opening is fitted on a shaft. In Patent Document 1, the bearing is mounted on the shaft by what is called a snap-fit structure in which the width of the bearing at its open ends is small with respect to the diameter of the shaft.

SUMMARY

In the common snap-fit structure disclosed in Patent Document 1, the open ends of the bearing hold the shaft. The bearing is bent in a direction of the normal to a contact between the shaft and a portion of the bearing near the open ends. The bending of the open ends allows mounting and removal of the shaft and the bearing. That is, a strong external force is applied in a direction in which the shaft and the bearing are separated from each other, the shaft forces open the open ends of the bearing, which may cause separation of the bearing from the shaft. On the other hand, if bending of the open ends of the bearing is made difficult to reduce separation of the bearing from the shaft, mounting of the bearing onto the shaft is made difficult.

One of objects of the present disclosure is to provide an improved pivot mechanism.

A pivot mechanism according to the present disclosure comprises: a shaft; a bearing comprising an opening portion in which the shaft is to be inserted, wherein a size of the opening portion at an open end of the bearing which has flexibility is less than a diameter of the shaft, and the bearing is configured to pivot about a pivot axis relative to the shaft; and a stopper disposed spaced apart from the shaft in a direction in which the shaft inserted in the opening portion moves away from the bearing, the stopper being movable in a direction different from the direction in which the shaft moves away from the bearing.

A pivot mechanism according to the present disclosure comprises: a shaft; a bearing comprising an opening portion in which the shaft is to be inserted, the bearing being configured to employ a snap-fit structure to suppress movement of the shaft inserted in the opening portion, in a direction in which the shaft inserted in the opening portion moves away from the bearing, the bearing being configured to pivot about a pivot axis relative to the shaft; and a stopper connected to the bearing, the stopper being disposed at a distant position spaced apart from the shaft in the direction in which the shaft inserted in the opening portion moves away from the bearing, the stopper being configured to prevent separation of the bearing from the shaft, the stopper being movable from the distant position.

A keyboard apparatus according to the present disclosure comprises: a key; a hammer assembly configured to pivot about a pivot mechanism in response to pressing of the key, the pivot mechanism comprising (i) a shaft, (ii) a bearing comprising an opening portion in which the shaft is to be inserted, wherein a size of the opening portion at an open end of the bearing which has flexibility is less than a diameter of the shaft, and the bearing is configured to pivot about a pivot axis relative to the shaft, and (iii) a stopper disposed spaced apart from the shaft in a direction in which the shaft inserted in the opening portion moves away from the bearing, the stopper being movable in a direction different from the direction in which the shaft moves away from the bearing; a sensor disposed below the key and configured to detect an operation for the key; and a sound source section configured to produce a sound waveform signal in response to a signal output from the sensor.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

EMBODIMENTS

Figure 1:
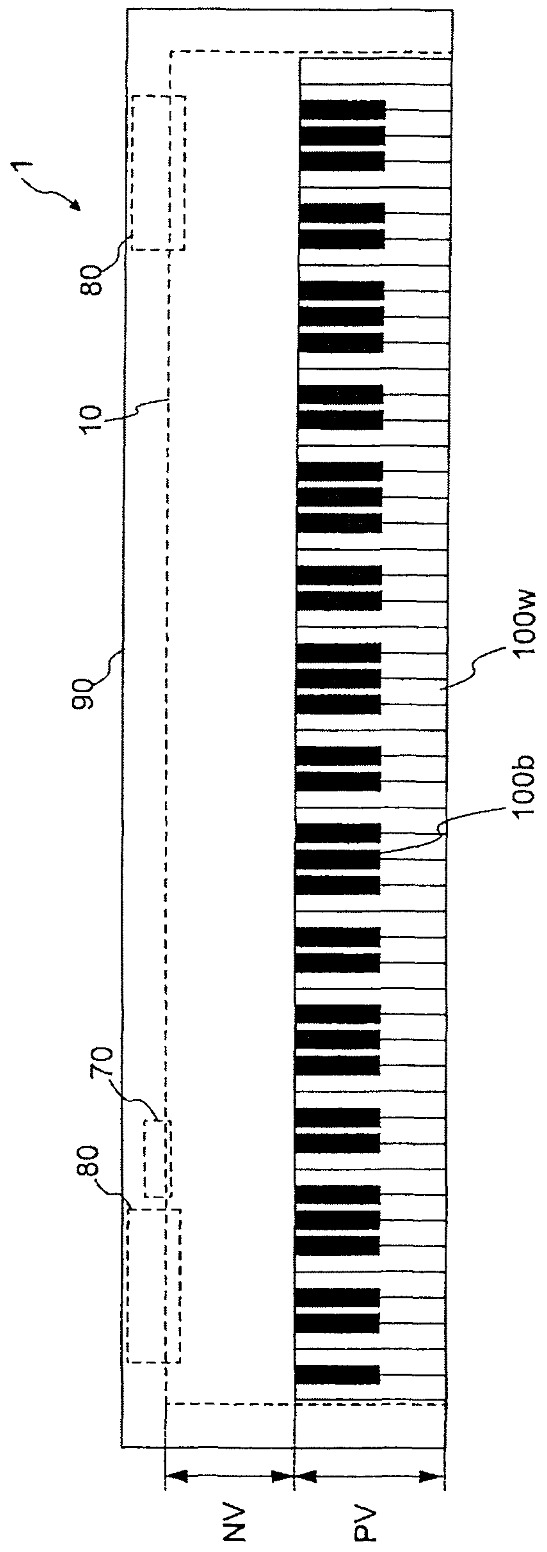
FIG. 1 is a view illustrating a configuration of a keyboard apparatus according to one embodiment of the present disclosure.

Hereinafter, there will be described keyboard apparatuses according to embodiments by reference to the drawings. It is to be understood that the following embodiments are described only by way of example, and embodiments of the present disclosure are not limited to the embodiments described below. It is noted that the same or similar reference numerals (e.g., numbers with a character, such as A or B, appended thereto) may be used for components having the same or similar function in the following description and drawings, and an explanation of which is dispensed with. The ratio of dimensions in the drawings (e.g., the ratio between the components and the ratio in the lengthwise, widthwise, and height directions) may differ from the actual ratio, and portions of components may be omitted from the drawings for easier understanding purposes. In the following explanation, the wording "pivot" means a relative action. For example, the wordings "a component A pivots relative to a component B" may mean any of pivotal movement of the component B with respect to the fixed component A, pivotal movement of the component A with respect to the fixed component B, and pivotal movement of both of the components A, B with respect to each other.

First Embodiment

Configuration of Keyboard Apparatus

FIG. 1 is a view of a configuration of a keyboard apparatus according to a first embodiment. In the present embodiment, a keyboard apparatus 1 is an electronic keyboard instrument, such as an electronic piano, configured to produce a sound when a key is pressed by a user (a player). It is noted that the keyboard apparatus 1 may be a keyboard-type controller configured to output data (e.g., MIDI) for controlling an external sound-source device, in response to key pressing. In this case, the keyboard apparatus 1 may include no sound-source device.

The keyboard apparatus 1 includes a keyboard assembly 10. The keyboard assembly 10 includes white keys 100*w* and black keys 100*b*. The white keys 100*w* and the black keys 100*b* are arranged side by side. The number of the keys 100 is N. In the present embodiment, N is 88. A direction in which the keys 100 are arranged will be referred to as "scale direction". The white key 100*w* and the black key 100*b* may be hereinafter collectively referred to "the key 100" in the case where there is no need of distinction between the white key 100*w* and the black key 100*b*. Also in the following explanation, "w" appended to the reference number indicates a configuration corresponding to the white key. Also, "b" appended to the reference number indicates a configuration corresponding to the black key.

A portion of the keyboard assembly 10 is located in a housing 90. In the case where the keyboard apparatus 1 is viewed from an upper side thereof, a portion of the keyboard assembly 10 which is covered with the housing 90 will be referred to as "non-visible portion NV", and a portion of the keyboard assembly 10 which is exposed from the housing 90 and viewable by the user will be referred to as "visible portion PV". That is, the visible portion PV is a portion of the key 100 which is operable by the user to play the keyboard apparatus 1. A portion of the key 100 which is exposed by the visible portion PV may be hereinafter referred to as "key main body portion".

The housing 90 contains a sound-source device 70 and a speaker 80. The sound-source device 70 is configured to create a sound waveform signal in response to pressing of the key 100. The speaker 80 is configured to output the sound waveform signal created by the sound-source device 70, to an outside space. It is noted that the keyboard apparatus 1 may include: a slider for controlling a sound volume; a switch for changing a tone color; and a display configured to display various kinds of information.

In the following description, up, down, left, right, front, and back (rear) directions (sides) respectively indicate directions (sides) in the case where the keyboard apparatus 1 is viewed from the player during playing. Thus, it is possible to express that the non-visible portion NV is located on a back side of the visible portion PV, for example. Also, directions and sides may be represented with reference to the key 100. For example, a key-front-end side (a key-front side) and a key-back-end side (a key-back side) may be used. In this case, the key-front-end side is a front side of the key 100 when viewed from the player. The key-back-end side is a back side of the key 100 when viewed from the player. According to this definition, it is possible to express that a portion of the black key 100*b* from a front end to a rear end of the key main body portion of the black key 100*b* is located on an upper side of the white key 100*w*.

Figure 2:
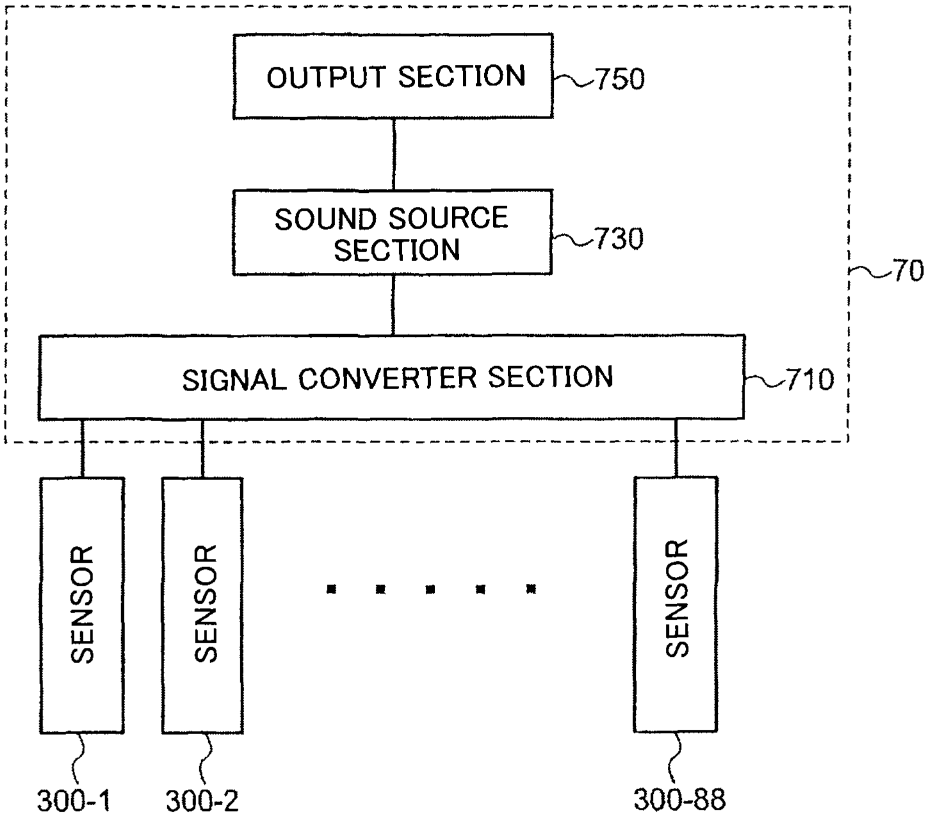
FIG. 2 is a block diagram illustrating a configuration of a sound-source device in the one embodiment of the present disclosure.

FIG. 2 is a block diagram illustrating the configuration of the sound-source device in the first embodiment. The sound-source device 70 includes a signal converter section 710, a sound source section 730, and an output section 750. Sensors 300 are provided corresponding to the respective keys 100. Each of the sensors 300 detects an action of a corresponding one of the keys 100 and outputs signals in accordance with the detection. In the present example, each of the sensors 300 outputs signals in accordance with three levels of key pressing amounts. The speed of the key pressing is detectable in accordance with a time interval between the signals.

The signal converter section 710 obtains the signals output from the sensors 300 (the sensors 300-1, 300-2, . . . , 300-88 corresponding to the respective 88 keys 100) and creates and outputs an operation signal in accordance with an operation state of each of the keys 100. In the present example, the operation signal is a MIDI signal. Thus, the signal converter section 710 outputs "Note-On" when a key is pressed. In this output, a key number indicating which one of the 88 keys 100 is operated, and a velocity corresponding to the speed of the key pressing are also output in association with "Note-On". When the player has released the key 100, the signal converter section 710 outputs the key number and "Note-Off" in association with each other. A signal created in response to another operation, such as an operation on a pedal, may be output to the signal converter section 710 and reflected on the operation signal.

The sound source section 730 creates the sound waveform signal based on the operation signal output from the signal converter section 710. The output section 750 outputs the sound waveform signal created by the sound source section 730. This sound waveform signal is output to the speaker 80 or a sound-waveform-signal output terminal, for example.

Configuration of Keyboard Assembly

Figure 3:
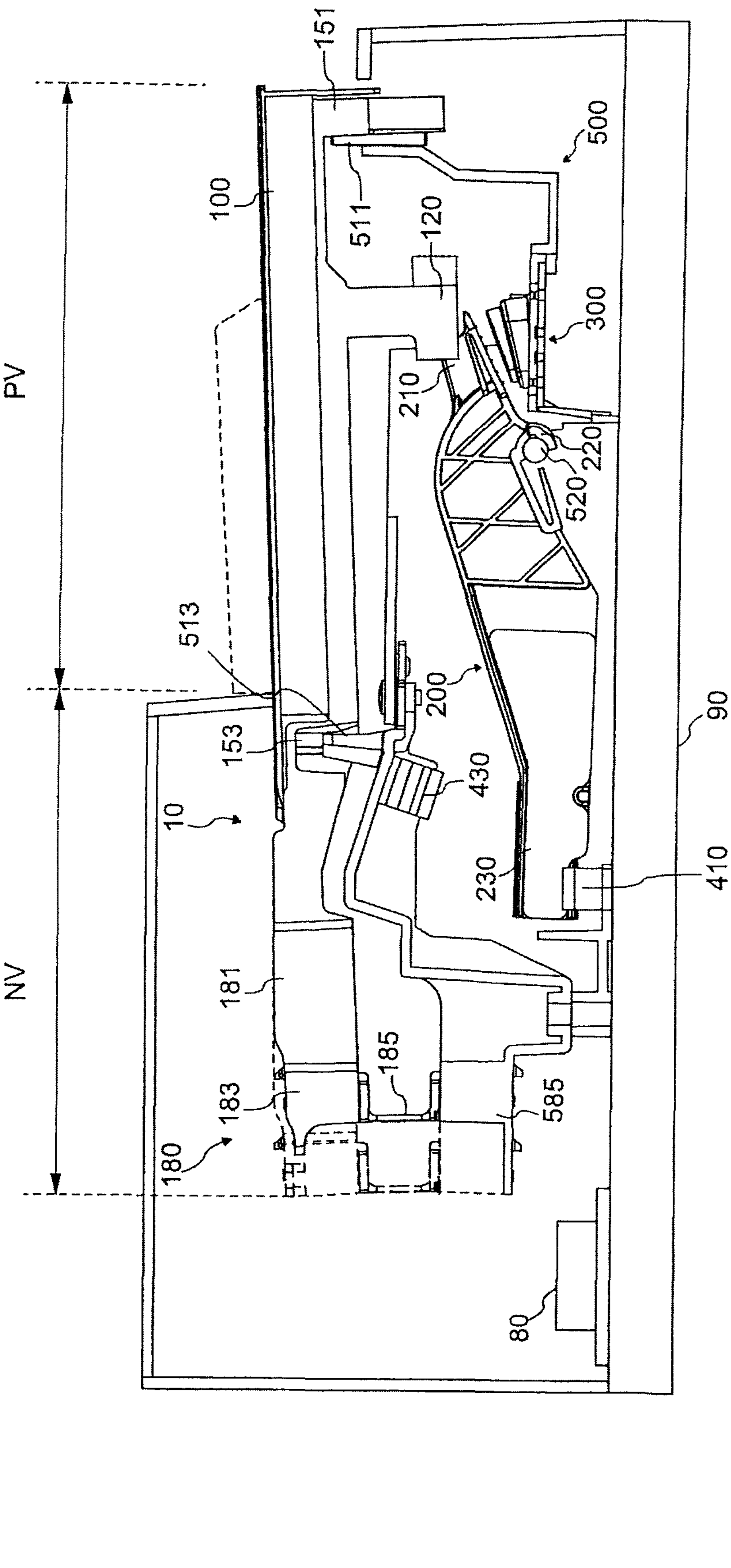
FIG. 3 is a view illustrating a configuration of the inside of a housing in the one embodiment, with the configuration viewed from a lateral side of the housing.

FIG. 3 is a view for explaining a configuration of the inside of the housing in the first embodiment, with the configuration viewed from a lateral side of the housing. As illustrated in FIG. 3, the keyboard assembly 10 and the speaker 80 are disposed in the housing 90. The speaker 80 is disposed at a back portion of the keyboard assembly 10. This speaker 80 is disposed so as to output a sound, which is produced in response to pressing of the key 100, toward up and down sides of the housing 90. The sound output downward travels toward the outside from a portion of the housing 90 near its lower surface. The sound output upward passes from the inside of the housing 90 through a space in the keyboard assembly 10 and travels to the outside from a space between the housing 90 and the keys 100 or from spaces each located between adjacent two of the keys 100 at the visible portion PV.

There will be next described a configuration of the keyboard assembly 10 with reference to FIG. 3. In addition to the keys 100, the keyboard assembly 10 includes a connecting portion 180, a hammer assembly 200, and a frame 500. The keyboard assembly 10 is formed of resin, and a most portion of the keyboard assembly 10 is manufactured by, e.g., injection molding. The frame 500 is fixed to the housing 90. The connecting portion 180 connects the keys 100 to the frame 500 such that the keys 100 are pivotable. The connecting portion 180 includes plate-like flexible members 181, key-side supporters 183, and rod-like flexible members 185. Each of the plate-like flexible members 181 extends from a rear end of a corresponding one of the keys 100. Each of the key-side supporters 183 extends from a rear end of a corresponding one of the plate-like flexible members 181. Each of the rod-like flexible members 185 is supported by a frame-side supporter 585 of the frame 500 and a corresponding one of the key-side supporters 183. That is, each of the rod-like flexible members 185 is disposed between a corresponding one of the keys 100 and the frame 500. The rod-like flexible member 185 is bent so as to enable the corresponding key 100 to pivot with respect to the frame 500. The rod-like flexible member 185 is detachable from the corresponding key-side supporter 183 and the frame-side supporter 585. It is noted that the rod-like flexible member 185 may be integral with the key-side supporter 183 and the frame-side supporter 585 or bonded so as not to be attached to or detached from the key-side supporter 183 and the frame-side supporter 585, for example.

The key 100 includes a front-end key guide 151 and a side-surface key guide 153. The front-end key guide 151 is in slidable contact with a front-end frame guide 511 of the frame 500 in a state in which the front-end key guide 151 covers the front-end frame guide 511. The front-end key guide 151 is in contact with the front-end frame guide 511 at opposite side portions of upper and lower portions of the front-end key guide 151 in the scale direction. The side-surface key guide 153 is in slidable contact with a side-surface frame guide 513 at opposite side portions of the side-surface key guide 153 in the scale direction. In the present embodiment, the side-surface key guide 153 is disposed at portions of side surfaces of the key 100 which correspond to the non-visible portion NV, and the side-surface key guide 153 is nearer to the front end of the key 100 than the connecting portion 180 (the plate-like flexible member 181), but the side-surface key guide 153 may be disposed at a region corresponding to the visible portion PV.

The hammer assembly 200 is attached so as to be pivotable with respect to the frame 500. A bearing 220 of the hammer assembly 200 is snap-fitted on a shaft 520 of the frame 500. A front end portion 210 of the hammer assembly 200 is located in an inner space of a hammer supporter 120 of the key 100 and in contact with the hammer supporter 120 slidably substantially in the front and rear direction. This sliding portion of the front end portion 210, i.e., portions of the front end portion 210 and the hammer supporter 120 which are in contact with each other, are located under the key 100 at the visible portion PV (located in front of a rear end of the key main body portion). It is noted that configurations of portions of the shaft 520 and the bearing 220 which are connected to each other (i.e., a pivot mechanism) will be described later in detail.

The hammer assembly 200 is provided with a metal weight 230 disposed on a back side of a pivot shaft. In a normal state (i.e., a state in which the key 100 is not pressed), the weight 230 is placed on a lower stopper 410, and the front end portion 210 of the hammer assembly 200 pushes the key 100 upward. When the key 100 is pressed, the weight 230 moves upward and comes into contact with an upper stopper 430. The hammer assembly 200 adds a weight to key pressing by the weight 230. The lower stopper 410 and the upper stopper 430 are formed of a cushioning material such as a nonwoven fabric and a resilient material, for example.

The sensor 300 is attached to the frame 500 under the hammer supporter 120 and the front end portion 210. When the key 100 is pressed, a lower surface of the front end portion 210 presses the sensor 300, causing the sensor 300 to output detection signals. As described above, the sensors 300 are provided for the respective keys 100.

Configuration of Pivot Mechanism of Hammer Assembly

Figure 4A:
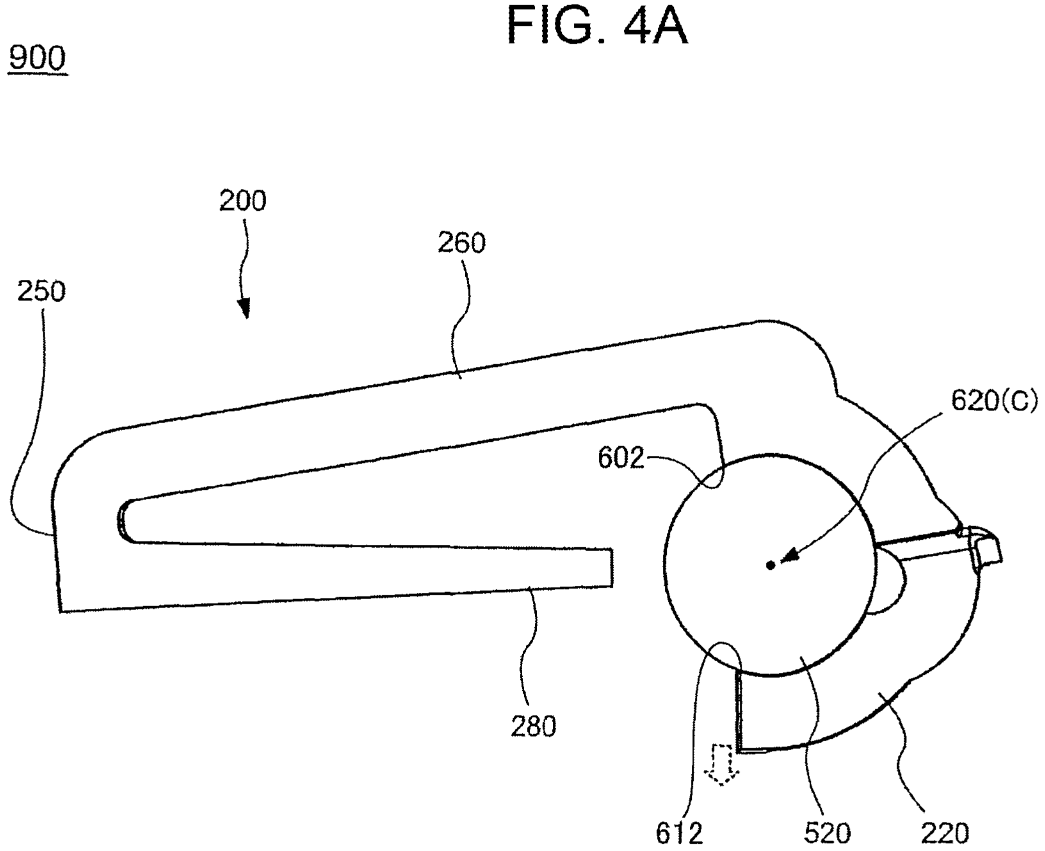
FIGS. 4A and 4B are enlarged views each illustrating a portion of a pivot mechanism of a hammer assembly according to one embodiment of the present disclosure.
Figure 4B:
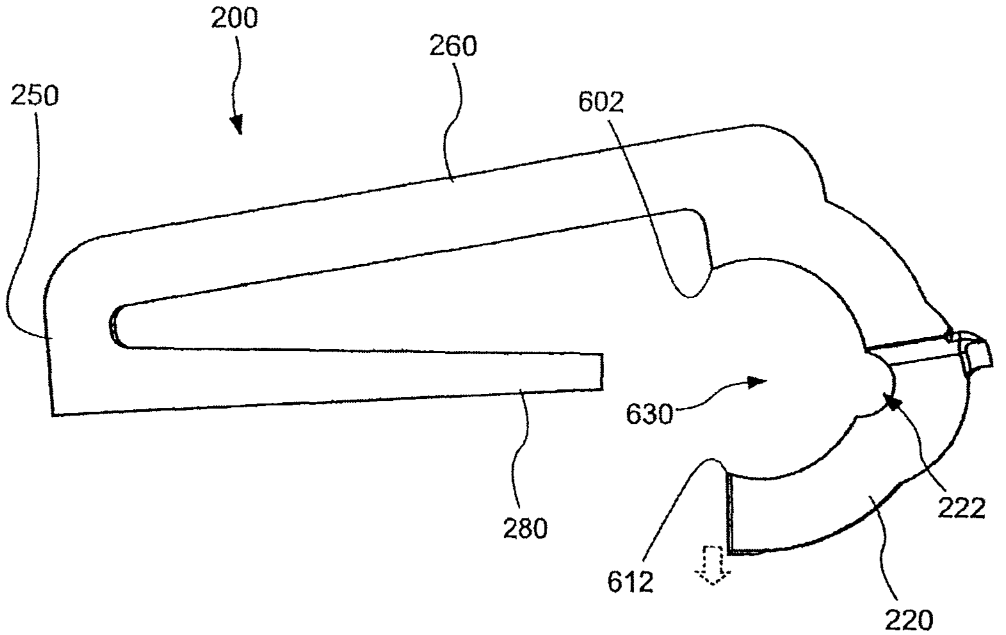

FIGS. 4A and 4B are enlarged views each illustrating a portion of the pivot mechanism of the hammer assembly in the one embodiment of the present disclosure. FIG. 4A is a view illustrating a state in which the bearing 220 is fitted on the shaft 520. FIG. 4B is an exploded view illustrating only the bearing 220. The hammer assembly 200 includes the bearing 220, a connecting portion 250, a body 260, and a shaft stopper 280. Here, a pivot mechanism 900 includes: the shaft 520 serving as a pivot shaft of the hammer assembly 200; the bearing 220 pivotable relative to the shaft 520; and the shaft stopper 280. There will be described a configuration in which the bearing 220 pivots with respect to the fixed shaft 520. However, this pivotal movement may be expressed as movement of the shaft 520 with respect to the hammer assembly 200 (the bearing 220) for easy understanding. The following embodiments may be applied to a configuration in which the shaft 520 pivots with respect to the fixed bearing 220.

The bearing 220 pivots about a pivot axis 620. When the bearing 220 pivots about the pivot axis 620 relative to the shaft 520 in a state in which an outer circumferential surface of the shaft 520 is in contact with an inner circumferential surface of the bearing 220, the pivot axis 620 is located in the shaft 520, and a position of the center C of a circle indicating a cross section of the shaft 520 in a plane perpendicular to the pivot axis 620 substantially coincides with position of the pivot axis 620 in the plane perpendicular to the pivot axis 620. The bearing 220 has an opening portion 630 constituted by the inside of the cylindrical shape of the bearing 220 and a cutout formed by cutting out a portion of the cylindrical shape. The shaft 520 is supported at a region inside the opening portion 630. The shaft 520 is supported in a state in which the shaft 520 is in contact with the inner circumferential surface of the bearing 220. A portion of the cylindrical shape of the bearing 220 is cut out to form open ends 602, 612 as end portions of the bearing 220. The width of a portion of the opening portion 630 at the open ends 602, 612, i.e., the distance between the open ends 602, 612, is less than the diameter of the circle as the cross section of the shaft 520. That is, the pivot mechanism 900 has a snap-fit structure in which the shaft 520 is engaged with the bearing 220. In other words, the bearing 220 supports the shaft 520 by the snap-fit structure. In other words, as illustrated in FIG. 4A, while the bearing 220 contacts the outer circumferential surface of the shaft 520, the open ends 602, 612 contact the outer circumferential surface of the shaft 520 at positions spaced apart from each other at a distance that is less than the diameter of the circle as the cross section of the shaft 520, thereby reducing separation of the shaft 520 from the bearing 220. A groove 222 is formed inside the opening portion 630. The groove 222 can be used as a grease container. The groove 222 achieves a smaller area of contact between the shaft 520 and the bearing 220, resulting in reduction in a frictional force in pivotal movement of the shaft 520 and the bearing 220. Here, in the case where the cross-sectional shape of the shaft 520 is not a round shape, the distance between the open ends 602, 612 is determined such that a portion of the shaft 520 is engaged by the bearing 220 in an area of pivotal movement of the bearing 220 with respect to the shaft 520.

The bearing 220 has flexibility. Bending of the bearing 220 increases the distance between the open ends 602, 612. While FIG. 4A illustrates an example of a structure in which the bearing 220 is bent such that only the open end 612 moves in a direction indicated by the arrow, the bearing 220 may be bent such that both of the open ends 602, 612 move as will be described below. Here, a direction in which the bearing 220 is bent near the open end 612 coincides with a direction of the normal to a contact between the shaft 520 and a portion of the bearing 220 which is located near the open end 612.

The shaft stopper 280 is disposed at a position opposed to the opening portion 630 and spaced apart from the shaft 520. In other words, the shaft stopper 280 is disposed spaced apart from the bearing 220 in a direction in which the shaft 520 inserted in the opening portion 630 of the bearing 220 is moved away from the bearing 220. The shaft stopper 280 is fixed to the bearing 220 via the connecting portion 250 and the body 260. The connecting portion 250 is provided opposite to the bearing 220 relative to the body 260. The connecting portion 250 extends downward from the body 260. The shaft stopper 280 is coupled to a lower end of the connecting portion 250 and extends from the connecting portion 250 toward the bearing 220. As which will be described later in detail, when the bearing 220 is about to be separated from the shaft 520, the shaft stopper 280 contacts the shaft 520 to prevent the bearing 220 from being separated from the shaft 520.

The shaft stopper 280 has flexibility and is bent in a direction toward at least the body 260. In the present embodiment, the shaft stopper 280 is bendable in a direction toward the body 260 and in a direction away from the body 260. In other words, the shaft stopper 280 is bent in a direction different from a direction in which the bearing 220 is separated from the shaft 520 (or a direction in which a direction in which the shaft 520 is separated from the bearing 220). In other words, the shaft stopper 280 is bendable in a direction substantially orthogonal to a straight line that connects a distal end of the shaft stopper 280 and the pivot axis 620 to each other. It is noted that the shape of the distal end of the shaft stopper 280 is a flat shape in FIG. 4A but is not limited to this shape. The distal end of the shaft stopper 280 may have any of a convex shape and a concave shape when viewed from the shaft 520. In the case where the distal end of the shaft stopper 280 has the concave shape, the concave surface of the distal end may have a portion of an arc centered about the pivot axis 620.

The shaft stopper 280 is configured such that its bending in the direction in which the bearing 220 is separated from the shaft 520 (i.e., a direction directed from the shaft 520 toward the shaft stopper 280) is suppressed. That is, the shaft stopper 280 is configured such that, when the shaft 520 is relatively moved in the direction in which the shaft 520 is separated from the bearing 220, bending of the shaft stopper 280 in a direction of the normal to a contact between the shaft stopper 280 and the shaft 520 (a direction in which the shaft stopper 280 extends) is suppressed.

While the cross-sectional shape of the shaft 520 is a round shape in FIG. 4A, the structure of the shaft 520 is not limited to this structure. For example, the cross-sectional shape of the shaft 520 may be a polygonal shape. Also, the inner surface of the opening portion 630 has the arc shape in the above-described example but may not have the arc shape.

Figure 5:
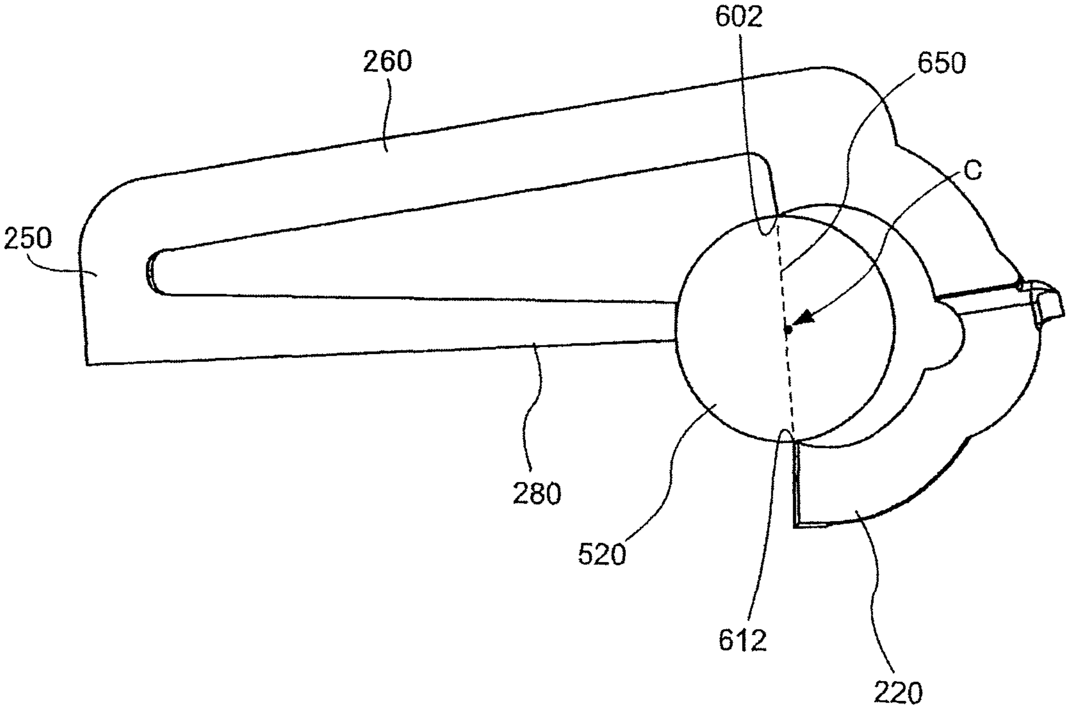
FIG. 5 is a view for explaining a state in which a bearing is about to be separated from a shaft in the one embodiment of the present disclosure.

FIG. 5 is a view for explaining a state in which the shaft stopper prevents the bearing from being separated from the shaft in the one embodiment of the present disclosure. When a strong external force is applied to the pivot mechanism 900 in a direction in which the shaft 520 and the bearing 220 are separated from each other, a portion of the bearing 220 near the open end 612 is pressed by the shaft 520. As a result, the bearing 220 is bent so as to increase the distance between the open ends 602, 612, and the bearing 220 moves in the direction in which the bearing 220 is separated from the shaft 520. That is, the shaft 520 is moved with respect to the bearing 220 in the direction directed from the shaft 520 toward the shaft stopper 280. In FIG. 5, the distal end of the shaft stopper 280 contacts the shaft 520 to prevent separation of the bearing 220 from the shaft 520. In other words, the distal end of the shaft stopper 280 serves as a shaft stopper that prevents separation of the bearing 220 from the shaft 520.

The bearing 220 acts on the shaft 520 such that the shaft 520 is pressed back into the opening portion 630 in the state in which the distal end of the shaft stopper 280 is in contact with the shaft 520. In other words, in the state in which the distal end of the shaft stopper 280 is in contact with the shaft 520, the shaft stopper 280 acts on the shaft 520 such that the shaft 520 is pressed back so as to establish a state in which the shaft 520 is snap-fitted on the bearing 220. In the case where the cross-sectional shape of the shaft 520 is the round shape centered about the center C as described above, the shaft stopper 280 preferably contacts the shaft 520 such that the center C of the circle does not move out of the opening portion 630 from the open ends 602, 612, that is, the shaft stopper 280 preferably contacts the shaft 520 before the center C of the circle moves out of the opening portion 630 from the open ends 602, 612. In other words, the shaft stopper 280 preferably contacts the shaft 520 such that the center C of the circle does not move out of the opening portion 630 from a straight line 650 that connects the open ends 602, 612 to each other. As illustrated in FIG. 5, the shaft stopper 280 is disposed with respect to the connecting portion 250 and the body 260 such that the longitudinal direction of the shaft stopper 280 and the direction in which the shaft 520 is separated from the bearing 220 are parallel with each other. With this arrangement, when the shaft 520 is relatively moved with respect to the bearing 220 in the direction away from the bearing 220, the shaft stopper 280 can reliably receive movement of the shaft 520, thereby reducing separation of the bearing 220 from the shaft 520.

Method of Disassembling Pivot Mechanism of Hammer Assembly

Figure 6:
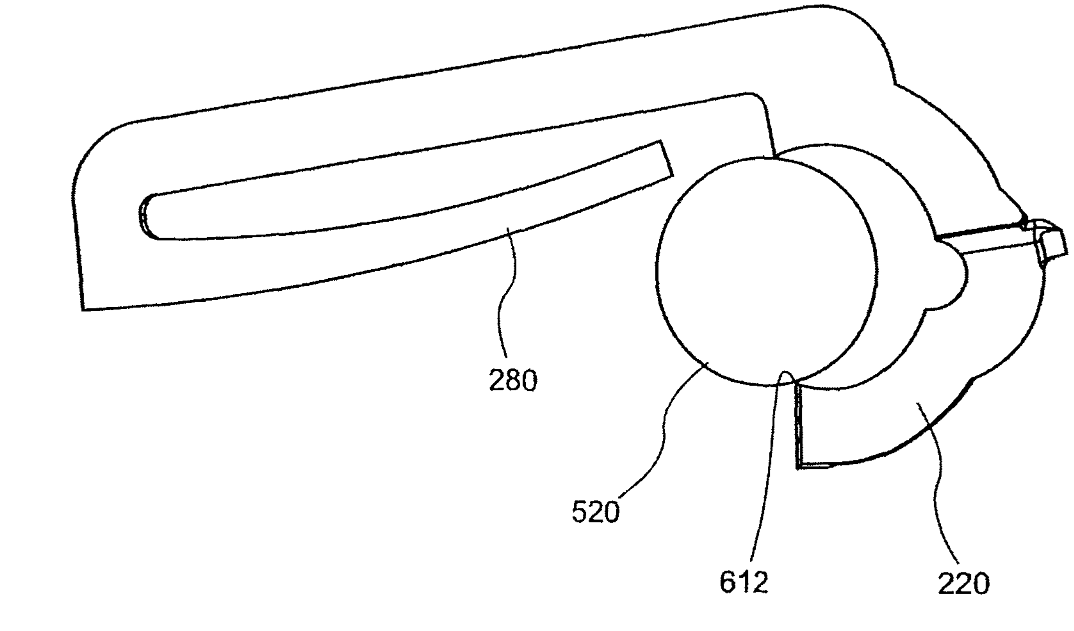
FIG. 6 is a view for explaining a state when the bearing is separated from the shaft in the one embodiment of the present disclosure.

FIG. 6 is a view for explaining a state in which the bearing is separated from the shaft in the one embodiment of the present disclosure. The separating method illustrated in FIG. 6 is a method of separating the bearing 220 from the shaft 520 by upward bending of the shaft stopper 280 from its state illustrated in FIG. 5 due to an external force. That is, movement of the shaft stopper 280 allows the shaft 520 to move to the outside of the opening portion 630. In this case, the shaft stopper 280 is bent upward by an external force, and the distance between the shaft stopper 280 and the open end 612 becomes greater than the diameter of the shaft 520, whereby the bearing 220 is separated from the shaft 520. When the distance between the shaft stopper 280 and the open end 612 has become greater than the greatest diameter of the shaft 520, the bearing 220 is separated from the shaft 520 regardless of a pivotal positional relationship between the shaft 520 and the hammer assembly 200.

In the pivot mechanism 900 according to the first embodiment as described above, it is possible to easily fit the shaft 520 in the bearing 220 and it is difficult for the bearing 220 to be separated from the shaft 520.

Operations of Keyboard Assembly

Figure 7A:
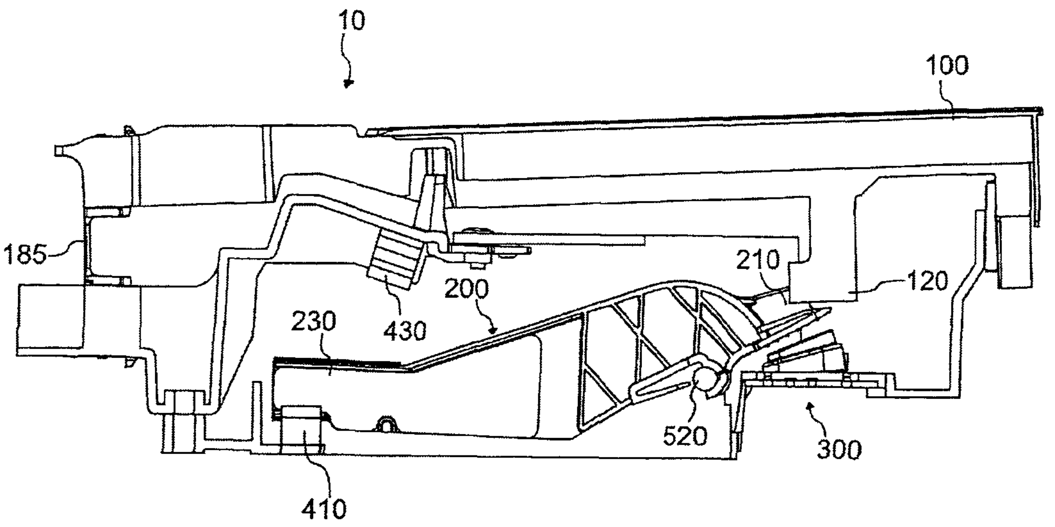
FIGS. 7A and 7B are views for explaining operations of a keyboard assembly when a key (a white key) is depressed in the one embodiment of the present disclosure.
Figure 7B:
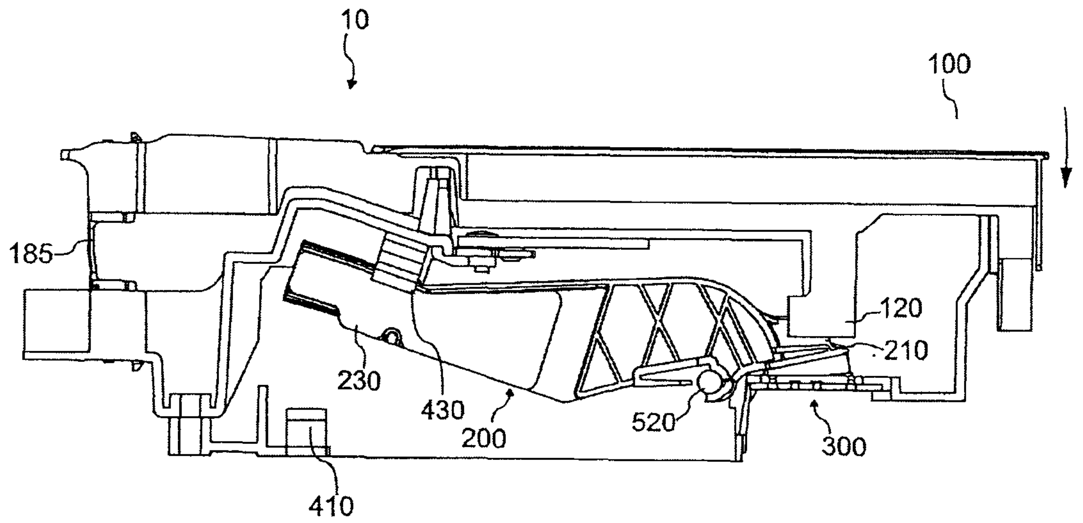

FIGS. 7A and 7B are views for explaining operations of the keyboard assembly when the key (the white key) is depressed in the one embodiment of the present disclosure. FIG. 7A illustrates a state in which the key 100 is located at a rest position (that is, the key is not depressed). FIG. 7B illustrates a state in which the key 100 is located at an end position (that is, the key is fully depressed). When the key 100 is pressed, the rod-like flexible member 185 is bent as a pivot center. In this state, the rod-like flexible member 185 is bent toward a front side of the key (in the front direction), but the side-surface key guide 153 inhibits movement of the key 100 in the front and rear direction, so that the key 100 pivots instead of moving frontward. The hammer supporter 120 depresses the front end portion 210, causing pivotal movement of the hammer assembly 200 about the shaft 520. When the weight 230 collides with the upper stopper 430, the pivotal movement of the hammer assembly 200 is stopped, and the key 100 reaches the end position. When the sensor 300 is pressed and deformed by the front end portion 210, the sensor 300 outputs the detection signals in accordance with the plurality of levels of an amount of deformation of the sensor 300 (i.e., the key pressing amount).

When the key is released, the weight 230 moves downward, the hammer assembly 200 pivots, and the key 100 pivots upward. When the weight 230 comes into contact with the lower stopper 410, the pivotal movement of the hammer assembly 200 is stopped, and the key 100 is returned to the rest position. In the keyboard apparatus 1 according to the first embodiment, as described above, the key 100 pivots at the connecting portion 180 in response to key pressing and key releasing.

Second Embodiment

Figure 8:
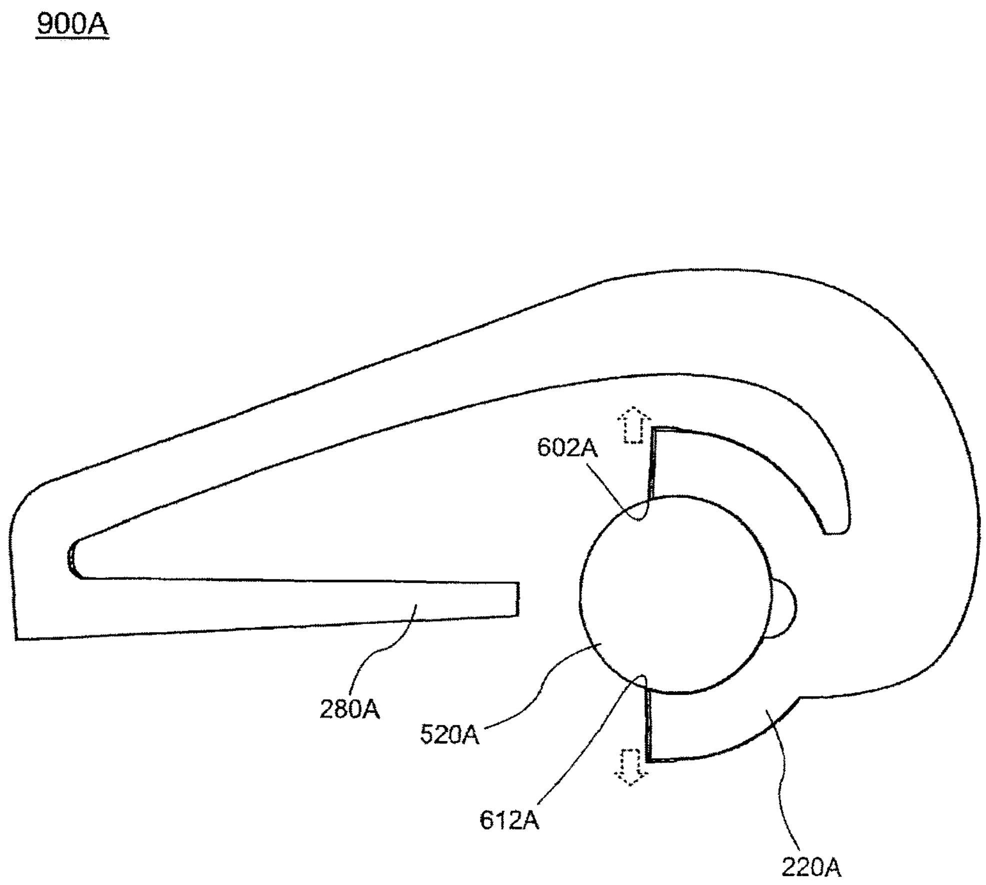
FIG. 8 is an enlarged view of a portion of a pivot mechanism of a hammer assembly according to one embodiment of the present disclosure.

There will be described a pivot mechanism 900A according to a second embodiment which is different in configuration from the pivot mechanism 900 according to the first embodiment. FIG. 8 is an enlarged view of a portion of a hammer assembly in the one embodiment of the present disclosure. In the pivot mechanism 900A according to the second embodiment, the shape of a bearing 220A is mainly different from the bearing 220 in the first embodiment. It is noted that the bearing 220A is snap-fitted on a shaft 520A.

The bearing 220A of the pivot mechanism 900A is bent such that open ends 602A, 612A respectively move in the directions indicated by the respective arrows. As in the first embodiment, a shaft stopper 280A is fixed to the bearing 220A via a connecting portion 250A and a body 260A.

The pivot mechanism 900A according to the second embodiment described above can obtain the same effects as obtained by the pivot mechanism 900 according to the first embodiment. The structure in the second embodiment may be applied to various snap-fit structures.

Third Embodiment

Figure 9:
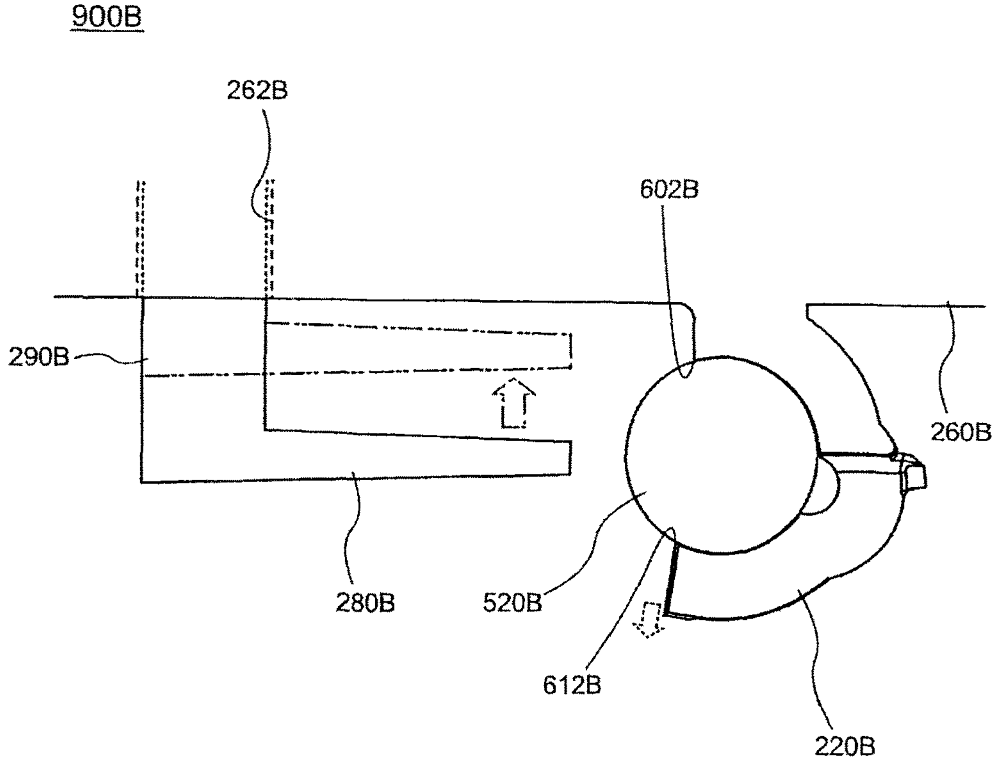
FIG. 9 is an enlarged view of a portion of a pivot mechanism of a hammer assembly according to one embodiment of the present disclosure.

There will be described a pivot mechanism 900B according to a third embodiment which is different in configuration from the pivot mechanism 900 according to the first embodiment. FIG. 9 is an enlarged view of a portion of a hammer assembly in the one embodiment of the present disclosure. In the pivot mechanism 900B according to the third embodiment, the shape of a shaft stopper 280B is mainly different from the shaft stopper 280 in the first embodiment. It is noted that a bearing 220B is snap-fitted on a shaft 520B.

The pivot mechanism 900B includes the bearing 220B, a body 260B, the shaft stopper 280B, and a stopper connecting portion 290B. The bearing 220B extends downward from the body 260B. The body 260B has an opening 262B. The shaft stopper 280B is coupled to the stopper connecting portion 290B at a lower end of the stopper connecting portion 290B. The stopper connecting portion 290B extends upward from the shaft stopper 280B and is inserted in the opening 262B. Since the stopper connecting portion 290B is inserted in the opening 262B, the shaft stopper 280B moves with the bearing 220B. The stopper connecting portion 290B is connected at its upper end to a moving mechanism. Operations of the moving mechanism cause upward and downward sliding movement of the stopper connecting portion 290B and the shaft stopper 280B.

It is noted that the stopper connecting portion 290B may be connected at its upper end to a resilient member, such as a compression spring or an extension spring, instead of the moving mechanism. In this case, a stopper for the shaft stopper 280B or the stopper connecting portion 290B may be provided such that the position of the shaft stopper 280B is determined to a position at which separation of the bearing 220B from the shaft 520B can be prevented.

The pivot mechanism 900B according to the third embodiment described above can obtain the same effects as obtained by the pivot mechanism 900 according to the first embodiment. The structure in the third embodiment may be applied to various snap-fit structures.

Fourth Embodiment

Figure 10:
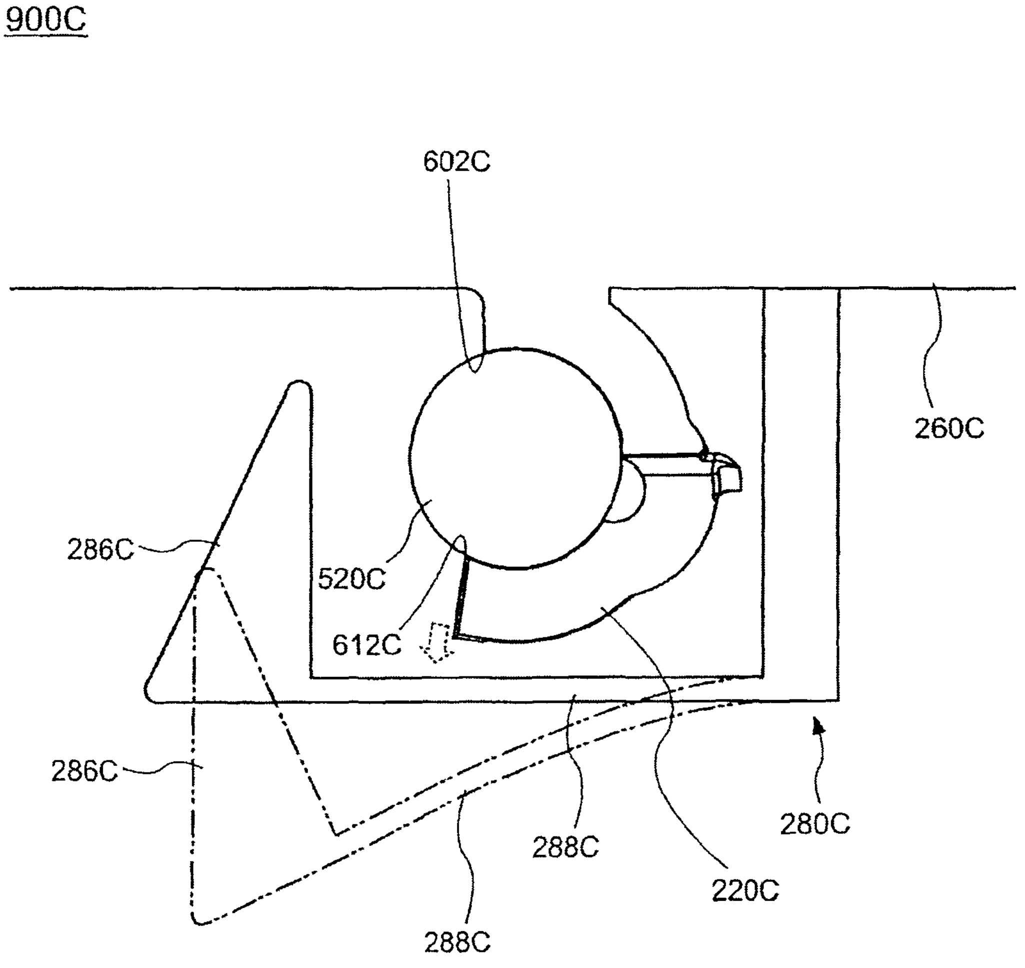
FIG. 10 is an enlarged view of a portion of a pivot mechanism of a hammer assembly according to one embodiment of the present disclosure.

There will be described a pivot mechanism 900C according to a fourth embodiment which is similar to the pivot mechanism 900B according to the third embodiment. FIG. 10 is an enlarged view of a portion of a hammer assembly in the one embodiment of the present disclosure. In the pivot mechanism 900C according to the fourth embodiment, the shape of a shaft stopper 280C is different from that of the shaft stopper 280B in the third embodiment. It is noted that a bearing 220C is snap-fitted on a shaft 520C.

The pivot mechanism 900C includes the bearing 220C, a body 260C, and the shaft stopper 280C. The bearing 220C and the shaft stopper 280C extend downward from the body 260C. The shaft stopper 280C includes a flexible arm 288C and a head 286C coupled to a distal end of the arm 288C. In the pivot mechanism 900C, the head 286C is depressed as indicated by the two-dot chain lines, and thereby the arm 288C is bent, so that the bearing 220C is separated from the shaft 520C.

Fifth Embodiment

There will be described a pivot mechanism 900D according to a fifth embodiment which is similar to the pivot mechanism 900B according to the third embodiment.

Figure 11A:
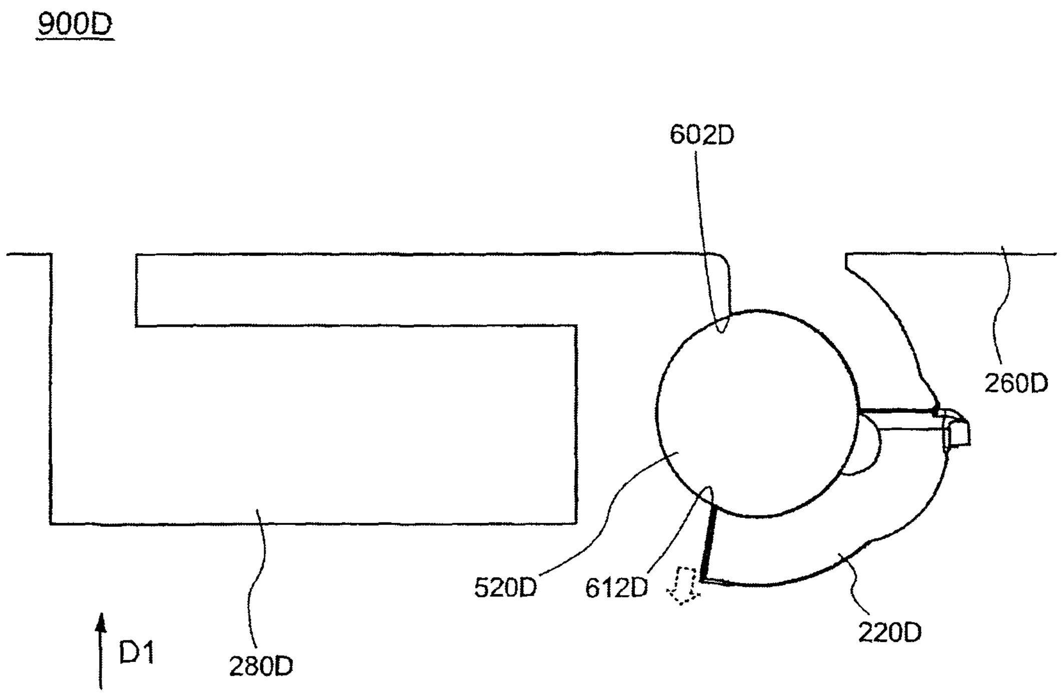
FIGS. 11A and 11B are enlarged views each illustrating a portion of a pivot mechanism of a hammer assembly according to one embodiment of the present disclosure.
Figure 11B:
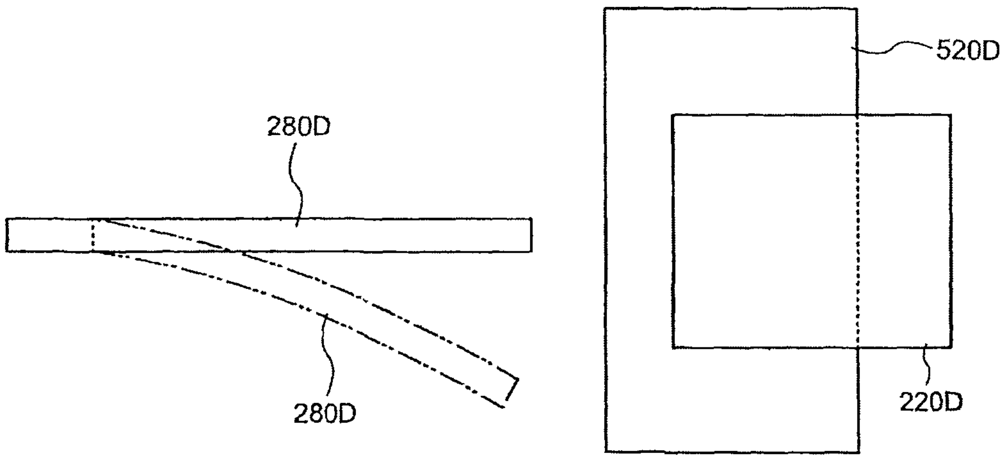

FIGS. 11A and 11B are enlarged views each illustrating a portion of a hammer assembly in the one embodiment of the present disclosure. In the pivot mechanism 900D according to the fifth embodiment, the shape of a shaft stopper 280D is different from that of the shaft stopper 280B in the third embodiment. It is noted that a bearing 220D is snap-fitted on a shaft 520D.

The pivot mechanism 900D includes the bearing 220D, a body 260D, and the shaft stopper 280D. FIG. 11A is a side view of a hammer assembly 200D. FIG. 11B is a bottom view of the hammer assembly 200D, viewed in the direction Dl. The bearing 220D and the shaft stopper 280D extend downward from the body 260D. The shaft stopper 280D is shaped like a plate that is thin in a direction in which the shaft 520D extends. The shaft stopper 280D is bent in the direction in which the shaft 520D extends (see FIG. 11B). It is noted that, as indicated by the two-dot chain lines in FIG. 11B, when the shaft stopper 280D is bent in the direction in which the shaft 520D extends, the bearing 220D is separated from the shaft 520D.

In the pivot mechanism 900C according to the fourth embodiment and the pivot mechanism 900D according to the fifth embodiment as described above, it is possible to easily fit the bearings 220C, 220D on the respective shafts 520C, 520D, and it is difficult for the bearings 220C, 220D from being separated from the respective shafts 520C, 520D.

In the above-described embodiments, the electronic piano is one example of the keyboard apparatus to which the hammer assembly is applied. The hammer assembly according to each of the above-described embodiments may be applied to pivot mechanisms of acoustic pianos (such as a ground piano and an upright piano). For example, each of the opening mechanisms in the above-described embodiments may be applied to a pivot mechanism of an upright piano which includes a pivotal component and a supporter configured to support a shaft of the pivotal component such that the pivotal component is pivotable. In this case, a sound producing mechanism corresponds to a hammer and a string. Each of the pivot mechanisms according to the above-described embodiments may be applied to any pivotal component other than the pivotal components of the pianos.

It is to be understood that the present disclosure is not limited to the illustrated embodiments, but may be embodied with various changes and modifications without departing from the spirit and scope of the disclosure.

The invention claimed is:

1. A pivot mechanism providing for an attachment between a stationary part and a pivotable part, the pivot mechanism comprising:

a shaft with a shaft length portion and ends, at least one of the ends being secured to one of the stationary part and the pivotable part;

a shaft length portion receiver secured to the other of the stationary part and the pivotable part and comprising a c-shaped member, made of a flexing material, defining an opening in which the shaft is to be inserted;

an arm secured to either an end or an intermediate part of the c-shaped member and extending away from the opening, the arm comprising an elbow at one end of the arm; and a blocker arm, made of a flexing material, extending from the elbow to face the opening of the shaft length portion receiver and having a blocking position when the blocker arm is not flexed and a non-blocking position when flexed, wherein the shaft is allowed to pivot with respect to the shaft length portion receiver while the shaft length portion is inserted in the opening and the blocker arm is at the blocking position not touching the shaft.

2. The pivot mechanism according to claim 1, wherein movement of the blocker arm allows the shaft to move to an outside of the opening.

3. The pivot mechanism according to claim 1, wherein the blocker arm is bendable in a direction different from a direction in which the shaft moves away from the shaft length portion receiver.

4. The pivot mechanism according to claim 1, wherein the blocker arm is bendable at least in a direction substantially orthogonal to a straight line connecting a distal end portion of the blocker arm and a pivot axis of the shaft to each other.

5. The pivot mechanism according to claim 1, wherein the blocker arm is disposed at a position at which the blocker arm acts such that, when the shaft is relatively moved toward the blocker arm, the blocker arm at the blocking position presses the shaft back into the opening by contacting the shaft.

6. The pivot mechanism according to claim 1, wherein a cross section of the shaft has a round shape, and wherein the blocker arm is disposed at the blocking position at which, when the shaft is relatively moved toward the blocker arm, the blocker arm contacts the shaft before a center of the round shape moves to an outer side of the opening.

7. A keyboard apparatus, comprising:

a key;

a hammer assembly configured to pivot about a pivot mechanism in response to pressing of the key, the pivot mechanism providing for an attachment between a stationary part and a pivotable part and comprising (i) a shaft with a shaft length portion and ends, at least one of the ends being secured to one of the stationary part and the pivotable part; (ii) a shaft length portion receiver secured to the other of the stationary part and the pivotable part and comprising a c-shaped member, made of flexing material, defining an opening in which the shaft is to be inserted; (iv) an arm secured to either an end or an intermediate part of the c-shaped member and extending away from the opening, the arm comprising an elbow at one end of the arm; and (v) a blocker arm, made of a flexing material, extending from the elbow into a space facing the opening of the shaft length portion receiver and having a blocking position when the blocker arm is not flexed and a non-blocking position when flexed, wherein the shaft is allowed to pivot with respect to the shaft length portion receiver while the shaft length portion is inserted in the opening and the blocker arm is at the blocking position not touching the shaft;

a sensor disposed below the key and configured to detect an operation of the key; and a sound source section configured to produce a sound waveform signal in response to a signal output from the sensor.

* * * * *